United States Patent
Tsai et al.

(10) Patent No.: US 9,021,571 B2
(45) Date of Patent: Apr. 28, 2015

(54) METHOD AND SYSTEM FOR PROCESSING A DATA TRANSFER RELATED TO A DATA-STORING CARD

(71) Applicants: Irene Tsai, New Taipei (TW); Yi-Fen Chou, Keelung (TW)

(72) Inventors: Irene Tsai, New Taipei (TW); Yi-Fen Chou, Keelung (TW)

(73) Assignees: Irene Tsai, New Taipei (TW); Yi-Fen Chou, Keelung (TW)

( * ) Notice: Subject to any disclaimer, the term of this patent is extended or adjusted under 35 U.S.C. 154(b) by 0 days.

(21) Appl. No.: 14/143,272

(22) Filed: Dec. 30, 2013

(65) Prior Publication Data
US 2014/0196138 A1   Jul. 10, 2014

(30) Foreign Application Priority Data
Jan. 4, 2013  (TW) .............................. 102100264 A

(51) Int. Cl.
| G06F 21/35 | (2013.01) |
| H04W 8/20 | (2009.01) |
| H04L 12/26 | (2006.01) |
| H04W 12/06 | (2009.01) |

(52) U.S. Cl.
CPC ............... *G06F 21/35* (2013.01); *H04W 8/205* (2013.01); *H04W 12/06* (2013.01); *G06F 2213/3806* (2013.01); *H04L 43/067* (2013.01)

(58) Field of Classification Search
CPC ..................................................... G06F 21/35
USPC .................. 726/9; 705/67; 713/193
See application file for complete search history.

(56) References Cited

U.S. PATENT DOCUMENTS

| 6,012,035 | A  * | 1/2000  | Freeman et al. .................. 705/2 |
| 7,494,058 | B2 * | 2/2009  | Bonalle et al. ................ 235/380 |
| 7,587,756 | B2 * | 9/2009  | Peart et al. ........................ 726/9 |
| 7,793,845 | B2 * | 9/2010  | Bonalle et al. ................ 235/487 |
| 2002/0092019 | A1* | 7/2002  | Marcus .......................... 725/37 |
| 2003/0194071 | A1* | 10/2003 | Ramian ................... 379/114.19 |
| 2003/0221118 | A1* | 11/2003 | Walker ......................... 713/193 |
| 2006/0015904 | A1* | 1/2006  | Marcus .......................... 725/46 |
| 2006/0076400 | A1* | 4/2006  | Fletcher ....................... 235/379 |
| 2006/0120519 | A1* | 6/2006  | Tamari et al. ............. 379/114.2 |
| 2006/0165060 | A1* | 7/2006  | Dua .............................. 370/352 |
| 2006/0287783 | A1* | 12/2006 | Walker .......................... 701/29 |

(Continued)

FOREIGN PATENT DOCUMENTS

| EP | 0 949 595 A2 | 10/1999 |
| EP | 2 128 830 A1 | 12/2009 |

(Continued)

OTHER PUBLICATIONS

Extended European Search Report in EP 13 19 8839 dated May 21, 2014.

*Primary Examiner* — Haresh N Patel
(74) *Attorney, Agent, or Firm* — Nixon & Vanderhye P.C.

(57) ABSTRACT

In a method for processing a data transfer, an electronic device accesses card-specific data and a card account number from a data-storing card. The electronic device generates a device-generated authentication number which is associated with the data transfer, and which is transmitted, together with the card account number and the card-specific data, to a network platform. The network platform compares an inputted authentication number from a portable device and the device-generated authentication number, and transmits to-be-transferred data to the portable device when the authentication numbers correspond with each other.

17 Claims, 13 Drawing Sheets

(56) References Cited

U.S. PATENT DOCUMENTS

| | | |
|---|---|---|
| 2007/0083444 A1* | 4/2007 | Matthews et al. ............... 705/30 |
| 2008/0040274 A1* | 2/2008 | Uzo ................................ 705/44 |
| 2008/0040285 A1* | 2/2008 | Wankmueller ................. 705/67 |
| 2008/0058014 A1 | 3/2008 | Khan et al. |
| 2010/0155470 A1* | 6/2010 | Woronec ........................ 235/380 |
| 2011/0029370 A1* | 2/2011 | Roeding et al. ............ 705/14.38 |
| 2011/0078245 A1 | 3/2011 | Kiffer |
| 2011/0225064 A1* | 9/2011 | Fou ............................ 705/26.41 |

FOREIGN PATENT DOCUMENTS

| | | |
|---|---|---|
| GB | 2 296 800 A | 7/1996 |
| WO | WO 03/053739 A2 | 7/2003 |

\* cited by examiner

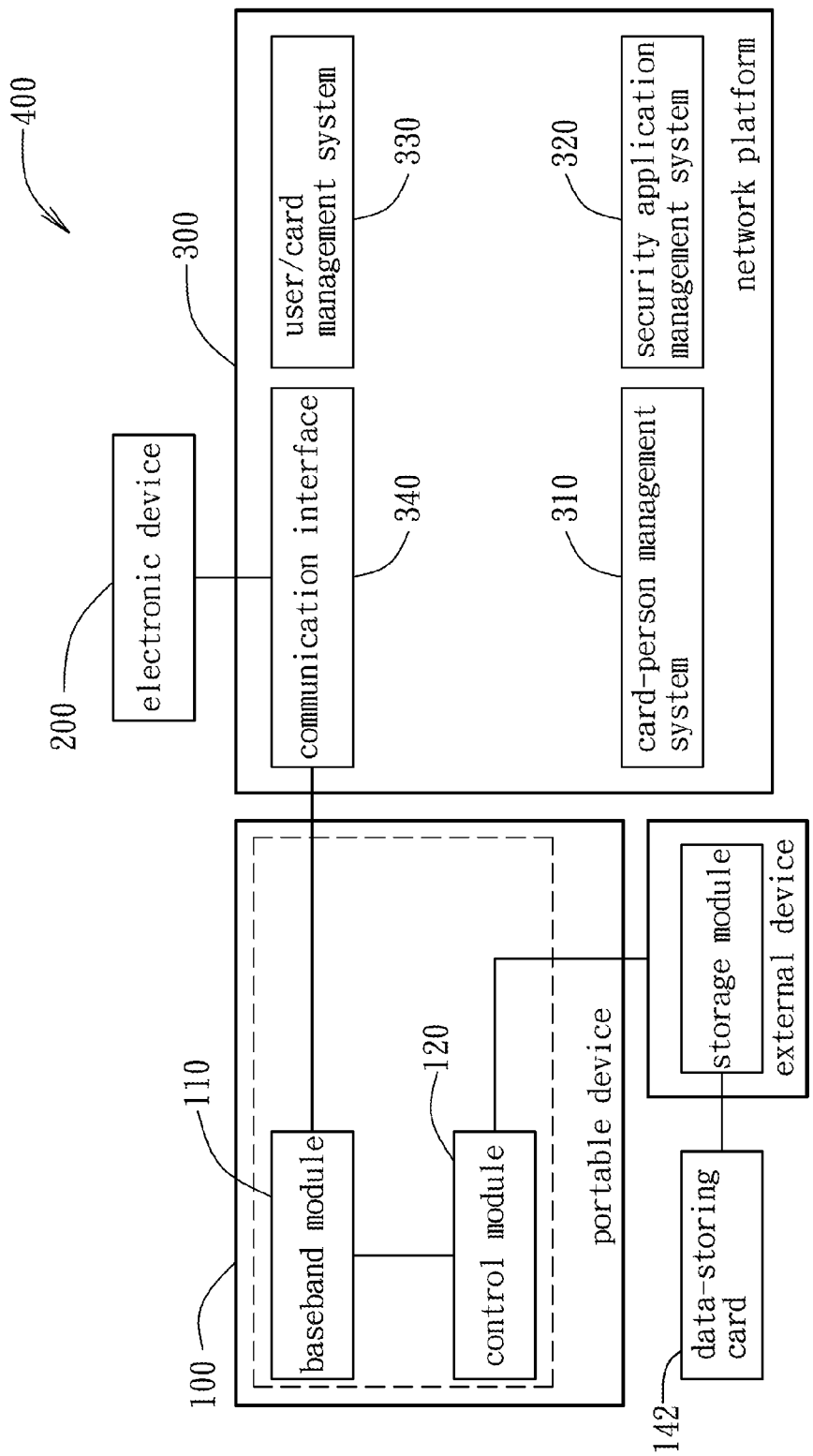
F I G. 10

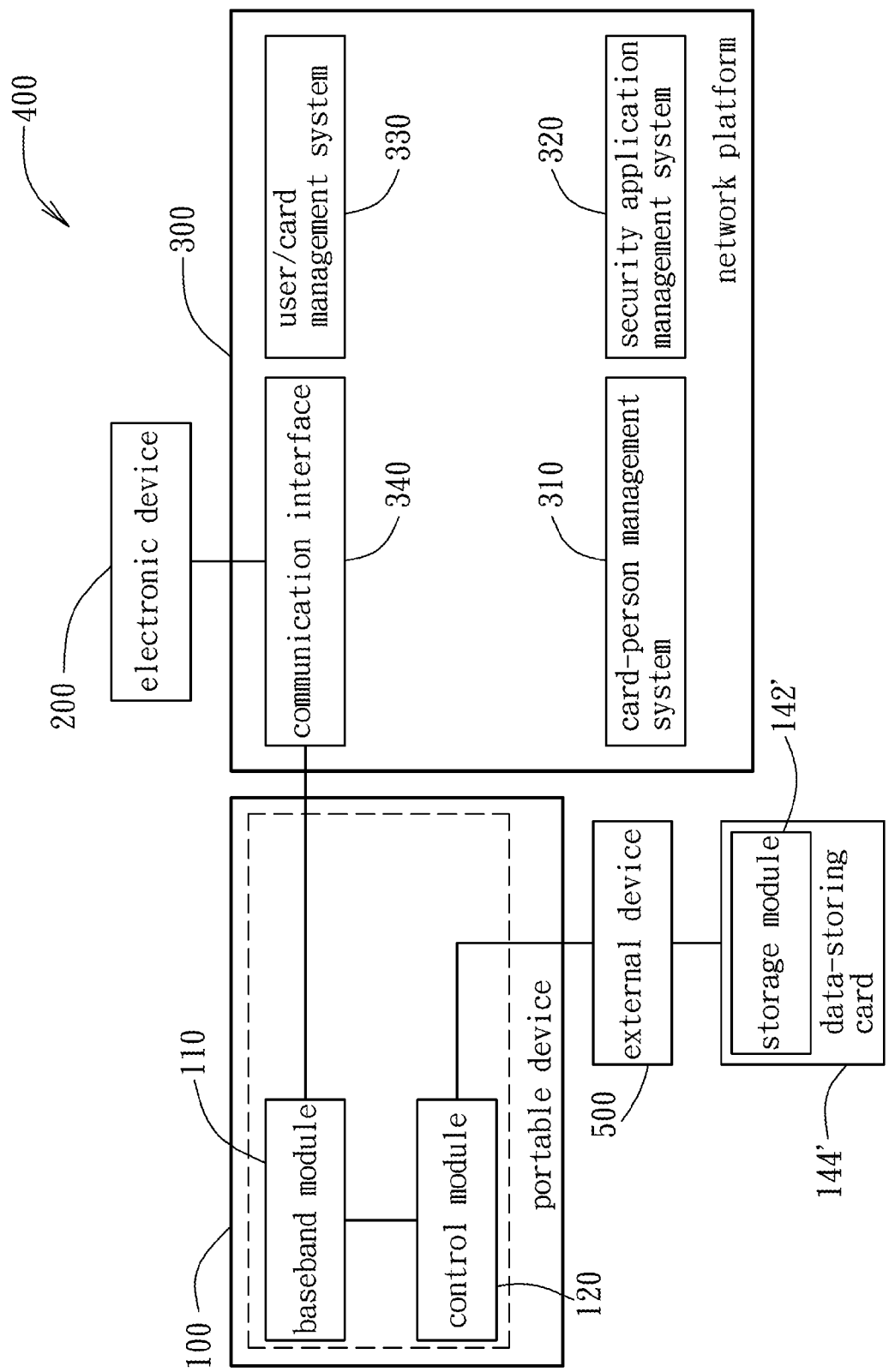
F I G. 12

METHOD AND SYSTEM FOR PROCESSING A DATA TRANSFER RELATED TO A DATA-STORING CARD

CROSS-REFERENCE TO RELATED APPLICATION

This application claims priority of Taiwanese Application No. 102100264, filed on Jan. 4, 2013.

BACKGROUND OF THE INVENTION

1. Field of the Invention

The invention relates to a method and a system for processing a data transfer, more particularly a method and a system for processing a data transfer which is related to data stored in a data-storing card.

2. Description of the Related Art

FIG. 1 is a schematic block diagram of a conventional mobile device 900. The mobile device 900 includes a baseband module 910, a subscriber identity module (SIM) card slot 920 coupled to the baseband module 910, and a secure digital (SD) card slot 930 coupled to the baseband module 910 and to be connected to a SD card. A SIM card is typically provided by a telephony service provider for authenticating a subscriber, and may be removably connected to the SIM card slot 920 for communication with the baseband module 910.

Nowadays, pocket-sized physical cards that are capable of holding information therein (e.g., a magnetic strip card, a smart card or the like) have been utilized for providing of many functions, such as electronic transaction, services provided by a vendor, and the like. Accordingly, the information held in a smart card may include personal information associated with a holder of the smart card, authentication credential, a balance of an electronic purse, application for performing specific functions, or the like.

The mobile device 900 is also widely used in conjunction with such physical cards for performing these functions. For example, a smart card may be coupled to the mobile device 900 through one of the SIM card slot 920 and the SD card slot 930 (for contact type cards) or through a wireless module that supports near field communication (NFC)/Radio-frequency identification (RFID) (for contactless type cards), thereby allowing the mobile device 900 to access the information stored in the smart card.

However, in most cases, different vendors or banks issue their own cards. For a user that employs services from many vendors/banks, he or she inevitably needs to carry many physical cards, and the SIM card slot 920 and/or the SD card slot 930 need to be frequently coupled to the physical cards, which may lead to inconvenience. It is thus desirable to reduce the number of physical cards that have to be carried without compromising the convenience brought about by the functions associated with the physical cards.

SUMMARY OF THE INVENTION

Therefore, one object of the present invention is to provide a method for processing a data transfer related to data stored in a data-storing card.

Accordingly, a method of the present invention is to be implemented using a data transferring system and comprises:

(A) when the data-storing card is coupled to an electronic device of the data transferring system, accessing, by the electronic device, card-specific data and a card account number from the data-storing card;

(B) generating, by the electronic device, a device-generated authentication number associated with the data transfer;

(C) transmitting, by the electronic device, the card account number, the card-specific data and the device-generated authentication number to a network platform of the data transferring system;

(D) receiving, by a portable device of the data transferring system, an inputted authentication number;

(E) transmitting, by the portable device, the inputted authentication number to the network platform;

(F) comparing, by the network platform, the inputted authentication number and the device-generated authentication number; and (G) when the inputted authentication number is deemed to correspond with the device-generated authentication number, transmitting, by the network platform, to-be-transferred data which is derived from the card-specific data, to the portable device.

Another object of the present invention is to provide a data transferring system that is capable of implementing the aforementioned method, in order to process a data transfer related to a data-storing card that stores card-specific data and a card account number.

Accordingly, a data transferring system of the present invention comprises an electronic device, a portable device and a network platform. In some embodiments, the data transferring system may comprise an external device for electrical connection to the portable device and the data-storing card.

The electronic device is configured to be coupled to the data-storing card for accessing the card-specific data and the card account number from the data-storing card. The network platform is operable to communicate with the portable device and the electronic device.

When coupled to the data-storing card, the electronic device is configured to generate a device-generated authentication number associated with the data transfer, and to transmit the card account number, the card-specific data and the device-generated authentication number to the network platform.

The portable device is configured to receive an inputted authentication number and to transmit the inputted authentication number to the network platform.

The network platform is configured to compare the inputted authentication number with the device-generated authentication number. When the inputted authentication number is deemed to correspond with the device-generated authentication number, the network platform is configured to transmit to-be-transferred data, which is derived from the card-specific data, to the portable device.

BRIEF DESCRIPTION OF THE DRAWINGS

Other features and advantages of the present invention will become apparent in the following detailed description of the preferred embodiments with reference to the accompanying drawings, of which:

FIG. 10 is schematic block diagram showing a mobile device according to a fifth preferred embodiment of the present invention;

FIG. 12 is a schematic block diagram showing a mobile device according to a seventh preferred embodiment of the present invention.

DETAILED DESCRIPTION OF THE PREFERRED EMBODIMENTS

Figure 1:
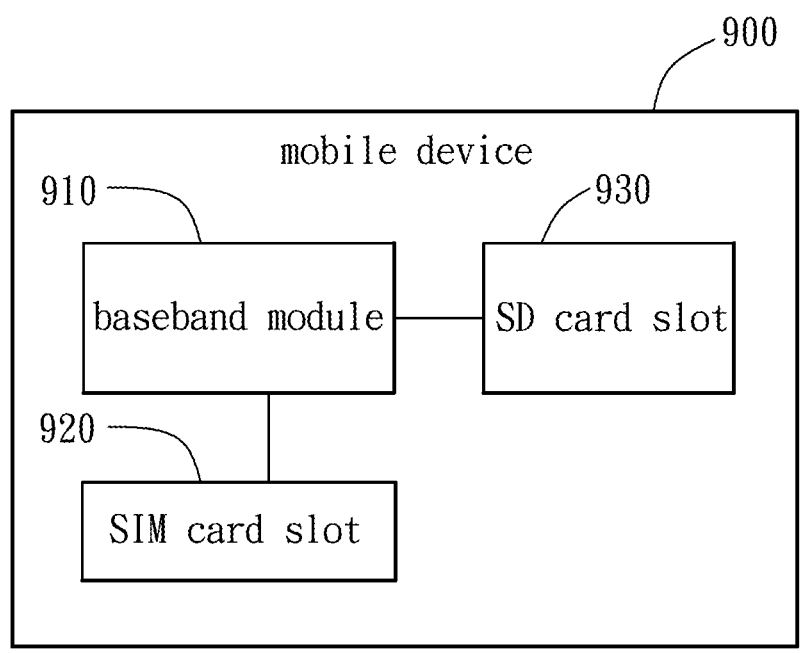
FIG. 1 is a schematic block diagram of a conventional mobile device.

Before the present invention is described in greater detail, it should be noted that like elements are denoted by the same reference numerals throughout the disclosure.

Figure 2:
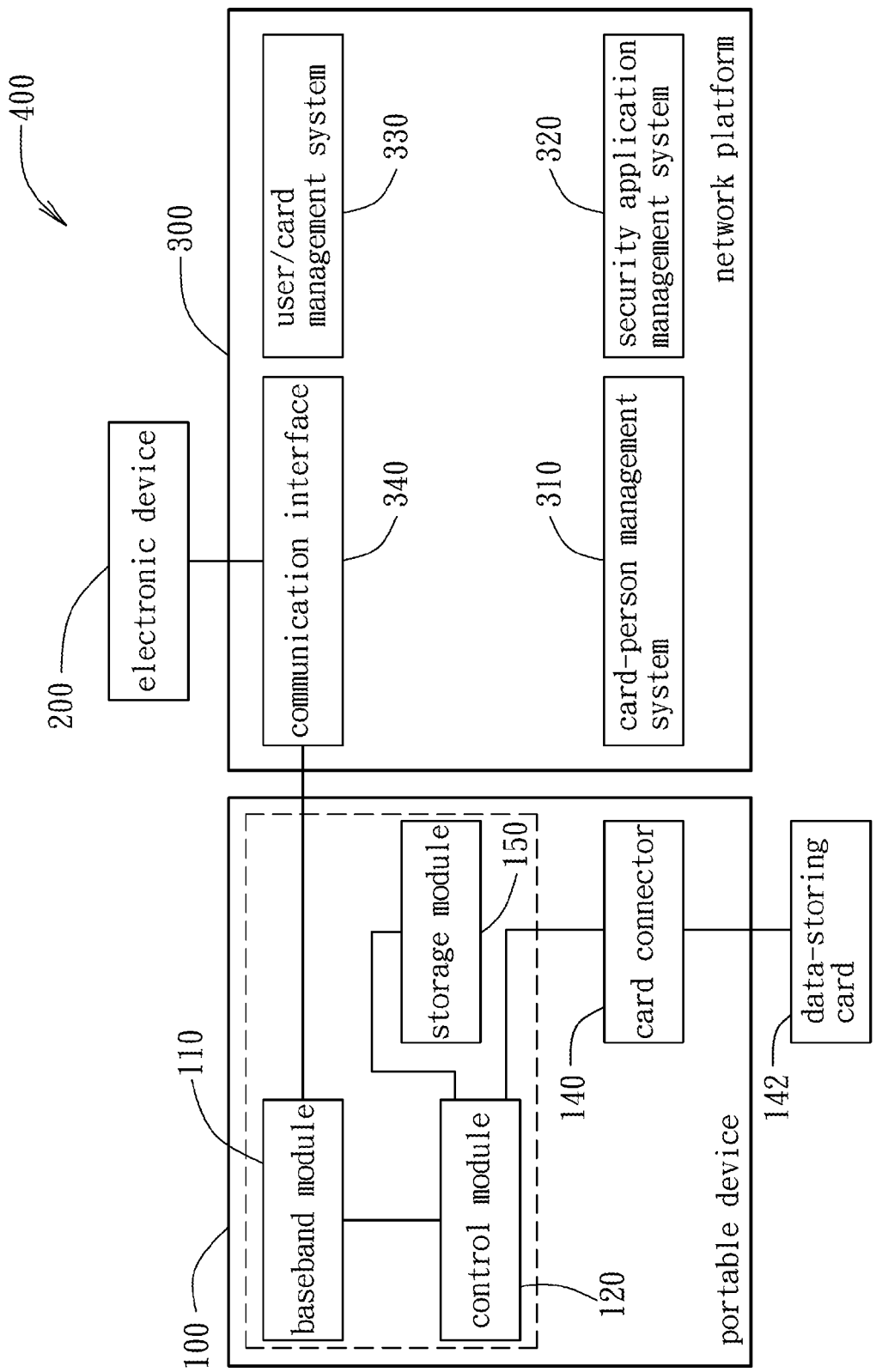
FIG. 2 is a schematic block diagram of a data transferring system according to a first preferred embodiment of the present invention.

FIG. 2 illustrates a data transferring system 400, according to a first preferred embodiment of the present invention. The data transferring system 400 comprises a portable device 100, an electronic device 200, and a network platform 300. The data transferring system 400 in the embodiments may enable the portable device 100 to obtain information from the network platform 300, such as application software.

The portable device 100 may be embodied as a personal digital assistant (PDA), a mobile telephone, a tablet computer, or other computing devices that support communication with a mobile network. In this embodiment, the portable device 100 includes a baseband module 110, a control module 120, and a storage module 150.

The baseband module 110 is an input/output device that supports International Organization for Standardization (ISO) 7816/Universal Asynchronous Receiver/Transmitter (UART) specification. In the embodiments, the baseband module 110 is configured to communicate with the network platform 300 for transceiving data therewith, and may include an application processor (not shown in the Figures) that provides software management, such as executing the OS and/or a booting sequence. The baseband module 110 may also include a baseband processor (not shown in the Figures) for handling radio functions, such as telephone and/or text message.

The control module 120 is coupled to the baseband module 110 and the storage unit 150. In this embodiment, the control module 120 is embodied as an integrated circuit (IC) chip that supports Java functions and ISO 7816 standard, and is configured to control transmission of data received by the baseband module 110 to the storage module 150 for storage in the storage module 150.

In the embodiments, the portable device 100 may further include a card connector 140 coupled to the control module 120, thereby allowing communication between the portable device 100 and a data-storing card. The card connector 140 may support ISO 7816 and/or ISO 14443 standard, such that communication between the card connector 140 and the data-storing card may be performed with or without physical contact.

In the embodiments, a data-storing card 142 may be embodied as, but is not limited to, a subscriber identity module (SIM) card, an Europay, MasterCard or Visa (EMV) bank card, a secure digital (SD) card or its variations (miniSD, microSD, etc), or other cards that support ISO 7816 or ISO 14443 standard, or other communication protocols (e.g., Bluetooth or transmissions in industrial, scientific and medical (ISM) radio bands). A set of card-specific data is stored in the data-storing card 142. The card-specific data may include personal information associated with a card holder, activity record of the card holder, a value or a bonus value associated with the data-storing card 142, etc.

In the embodiments, the storage module 150 may be implemented using software, hardware or a combination thereof. In some embodiments, the storage module 150 is integrated with the control module 120. The storage module 150 is configured to store information such as an operating system, a software application, a JAVA applet such as a SIM application toolkit (STK), or the like. The above mentioned information may be obtained using over-the-air (OTA) technology.

In this embodiment, the control module 120 is an integrated circuit (IC) application chip having a Java card-based design that implements a JAVA virtual machine, and may be implemented with the baseband module 110 onto a single IC chip. It is noted that in embodiments where the storage module 150 is integrated with the control module 120, the storage module 150 is implemented using the JAVA virtual machine.

In some embodiments, the control module 120 may be an individual electronic card detachably connected to the portable device 100. The effect of using the Java card-based design structure for the control module 120 is that the control module 120 can be operated to process applications that are compatible with the Java card-based design structure (e.g., applications related to EMV, People's bank of China (PBOC), certificate authority (CA), and public key infrastructure (PKI)), and that the Java card-based design structure enables OTA configuration, such that the operating system, software applications and information stored in the control module 120 may be updated and maintained conveniently.

In the embodiments, the electronic device 200 may be a point of sale (POS) machine, and is configured to be coupled to the data-storing card 142 using contact/contactless communication technologies. The electronic device 200 may be installed with an application programming interface (API) that, when executed, causes the electronic device 200 to perform various operations and functions.

In the embodiments, the network platform 300 may include a card-person management system 310, a security application management system 320, a user/card management system 330, and a communication interface 340 for communicating with the baseband module 110 of the portable device 100.

The card-person management system 310 is stored with personal information associated with the customers of various vendors. In some embodiments, various lists may be created for managing the personal information. One of a symmetric-key algorithm and an asymmetric-key algorithm can be employed when storing such information. The network platform 300 may include a hardware security module (HSM) for managing the personal information.

The security application management system 320 is stored with a plurality of executable programs (e.g., JAVA applets, mobile software applications, or the like), which may be tailor-made for the vendors and may be downloaded by the portable device 100. One of the symmetric-key algorithm and the asymmetric-key algorithm can be employed when storing the executable programs. The HSM may be similarly used to manage the executable programs.

The communication interface 340 is coupled to the baseband module 110 of the portable device 100 and the electronic device 200, and is operable to transmit information thereto using one of a text message, general packet radio service (GPRS), internet protocol suite (TCP/IP), etc.

Figure 3:
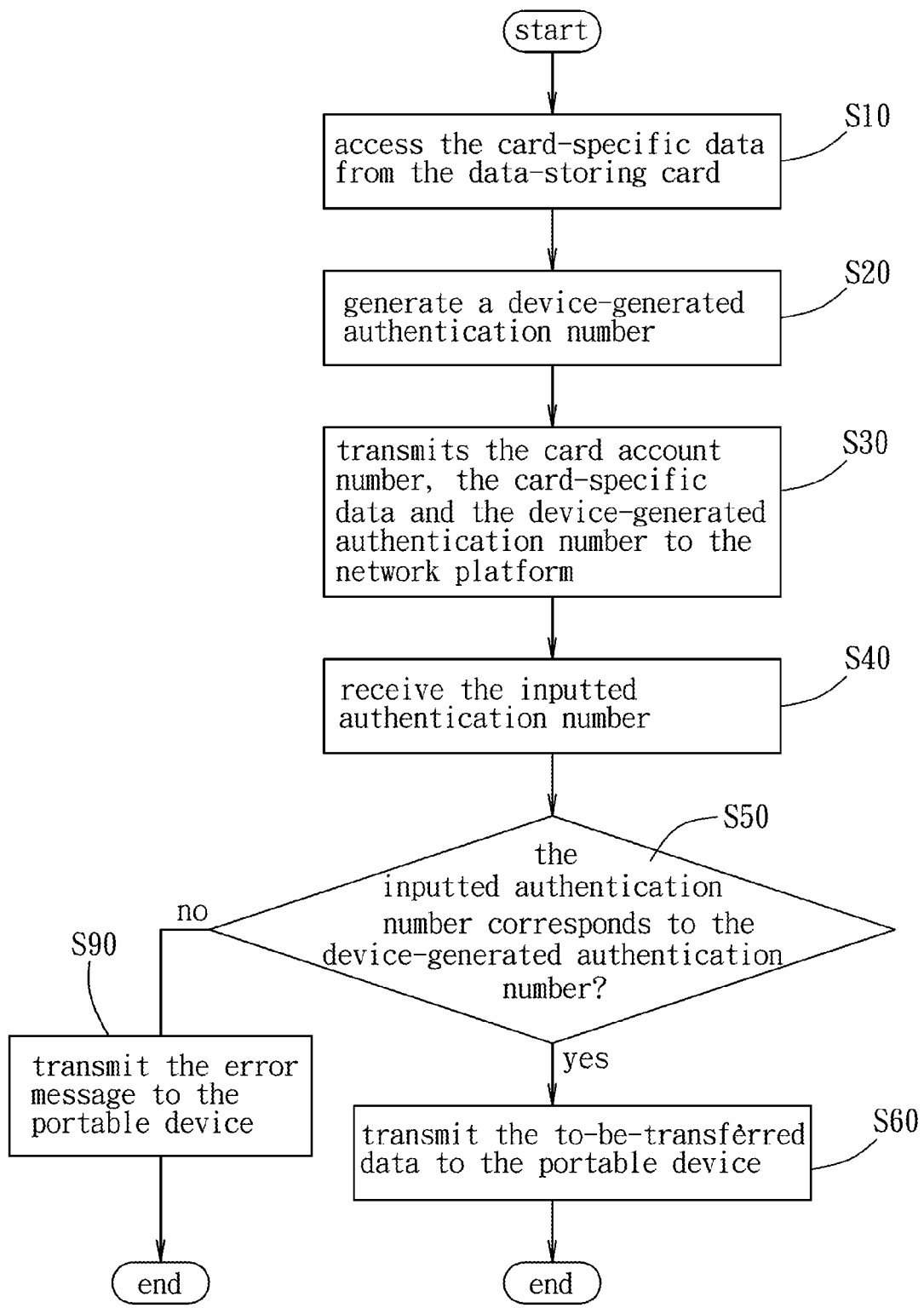
FIG. 3 is a flow chart illustrating a method executed by the data transferring system for processing a data transfer.

Referring to FIG. 3, a particular function of the data transferring system 400 is illustrated. Specifically, a method is executed by the data transferring system 400 in order to perform a data transfer related to the data-storing card 142, in which the data stored in the data-storing card 142 is transferred to the portable device 100.

In the embodiments, the method may take place at a location of a POS of a vendor (e.g., a coffee shop, a department store, or the like), with which the data-storing card 142, serving for example as a membership card, is associated. The data-storing card 142 stores card-specific data and a card account number.

The user of the portable device 100 may request that the data stored in the data-storing card 142 be transferred into the portable device 100, thereby eliminating the need to carry the data-storing card 142. The vendor may also offer the user to have the data stored in the data-storing card 142 transferred into the portable device 100.

Figure 4:
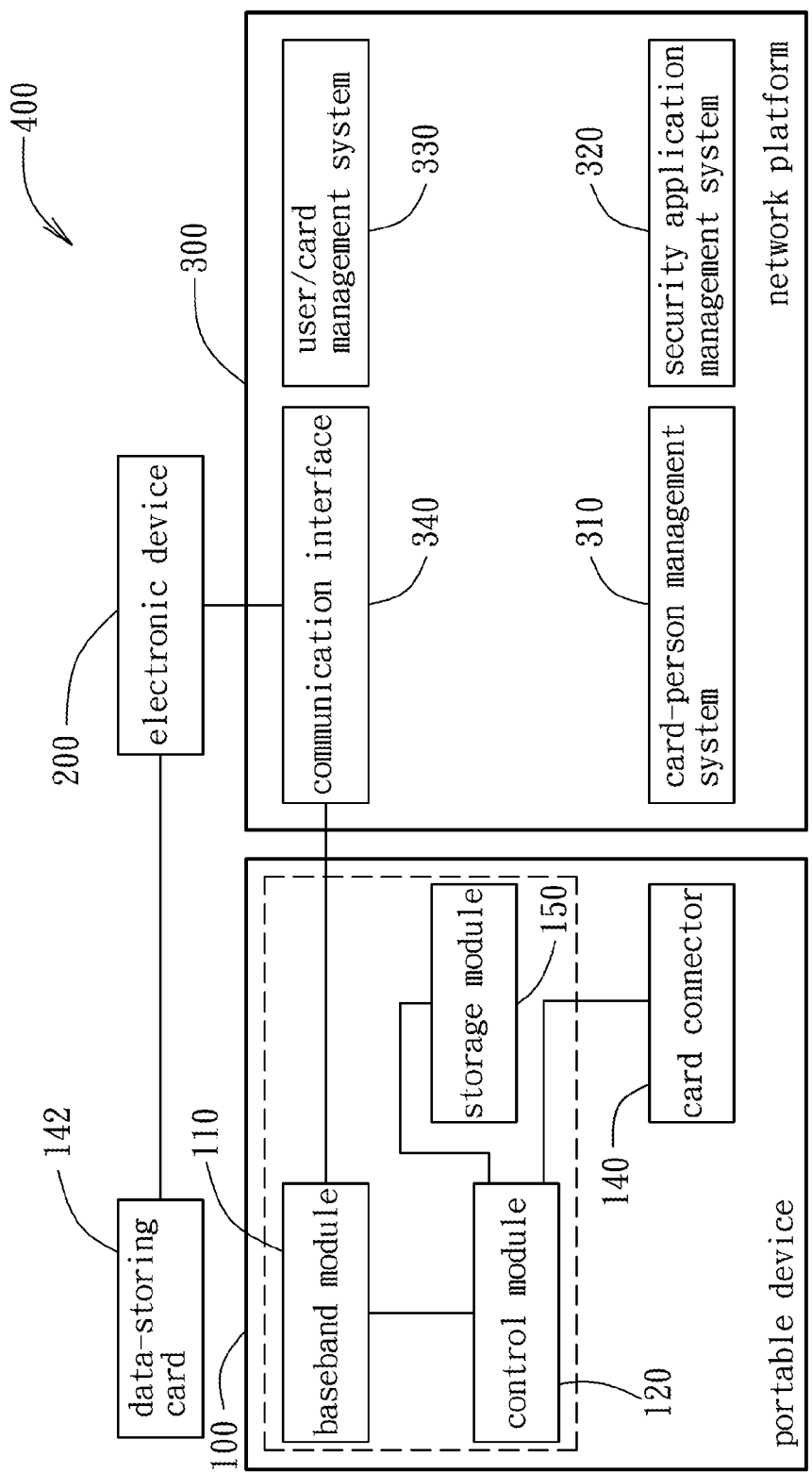
FIG. 4 is a schematic block diagram showing the mobile device of FIG. 2, when the method of FIG. 3 is to be executed.

In such cases, the data-storing card 142 is coupled to the electronic device 200 (see FIG. 4), and the vendor may then activate the API to execute the subsequent steps. In step S10, with the use of, for example, a card reader, the electronic device 200 is able to access the card account number and the card-specific data from the data-storing card 142, and subsequently store the card-specific data in the user/card management system 330. In the embodiments, the card account number may include at least one of a phone number associated with the portable device 100, an identification number of a user of the portable device, a birth date of the user of the portable device 100, and a card number of the data-storing card 142, and the like.

In step S20, the electronic device 200 generates a device-generated authentication number associated with the data transfer. The device-generated authentication number may be generated based upon the card account number that is received in step S10. The electronic device 300 then transmits the card account number, the card-specific data and the device-generated authentication number to the network platform 300 via the baseband module 110 and the communication interface 340 in step S30.

The user of the portable device 100 attempts to locate to-be-transferred data, which is derived from the card-specific data and is desired to be transferred to the portable device 100, in the application management system 320 of the network platform 300. In this embodiment, the to-be-transferred data includes an executable application (APP) that can be found in a typical mobile software distribution platform, such as App Store, Google Play, Samsung Apps, or the like. The APP is associated with the vendor, and is executable by the portable device 100. Once the APP is located (i.e., the user finds a download link of the APP in the mobile software distribution platform), the user of the portable device 100 may initiate the download (i.e., by pressing the "download" button on an interface of the portable device 100). In response, the control module 120 generates a request for data transfer, and to transmit the request to the network platform 300 via the baseband module 110.

Then, in step S40, the portable device 100 displays a dialog box (now shown in the Figures) that allows the user of the portable device 100 to input an inputted authentication number therethrough. This step may be a result from a response to the request for data transfer from the network platform 300, which requests authentication from the portable device 100. In some embodiments, the user of the portable device 100 is informed by the vendor of the device-generated authentication number. The user subsequently inputs the device-generated authentication number into the dialog box to serve as the inputted authentication number. The inputted authentication number received by the portable device 100 is then transmitted to the network platform 300.

After the network platform 300 receives the inputted authentication number, in step S50, the network platform 300 compares the inputted authentication number and the device-generated authentication number. When the inputted authentication number is deemed to correspond with the device-generated authentication number, in step S60, the network platform 300 transmits the to-be-transferred data to the portable device 100. Specifically, the network platform 300 associates the card-specific data retrieved from the data-storing card 142 with the APP stored in the application management system 320, and transmits the associated card-specific data and the APP to the portable device 100.

In some embodiments, the network platform 300 deems the inputted authentication number to correspond with the device-generated authentication number when the inputted authentication number is found to be identical to the device-generated authentication number. In other embodiments, the network platform 300 transmits the to-be-transferred data when the inputted authentication number is deemed to logically correspond with the device-generated authentication number.

Conversely, when the inputted authentication number is deemed to not correspond with the device-generated authentication number, the flow proceeds to step S90, in which the network platform 300 generates an error message indicating that the inputted authentication number is incorrect, and transmits the error message to the portable device 100 for display to the user. In this case, the portable device 100 is still allowed to download the APP, but the card-specific data is not associated with the APP and not subsequently transmitted to the portable device 100.

In response to receipt of the to-be-transferred data by the baseband module 110, in step S60, the control module 120 of the portable device 100 controls transmission of the to-be-transferred data to the storage module 150 for storage in the storage module 150. As a result, the card-specific data that is originally stored in the data-storing card 142 is now stored in the storage module 150, and can be accessed by the portable device 100 by the APP. Accordingly, the user of the portable device 100 does not need to bring the data-storing card 142 the next time he or she intends to obtain products and/or services that are originally associated with the data-storing card 142. In other words, the portable device 100 may serve as a virtual JAVA card that is capable of performing the functions of the data-storing card 142. Moreover, the card connector 140 is left available as a result of the method, and may therefore be utilized for other purposes.

The method of this embodiment may be particularly useful for products and/or services that are said to have stickiness (e.g., that attract the customers to spend more time and/or money on the products and/or services, thus the customers "sticking" to them). Such sticky products and/or services may include daily transportation services such as bus or mass rapid transit (MRT), and products in a convenient store, or the like. When the method of this embodiment has been used to transfer various sticky products and/or services to the portable device 100, the user of the portable device 100 only needs to execute the various APPS that correspond to the sticky products and/or services when attempting to access the sticky products and/or services, instead of using various physical cards.

In a modification of this embodiment (see FIG. 5), the portable device 100 may include a SIM card connector 130 which is coupled to the baseband module 110, and which is to be coupled to a SIM card 132. In addition, the card connector 140 may be coupled to the baseband module 110 instead of the control module 120.

Figure 6:
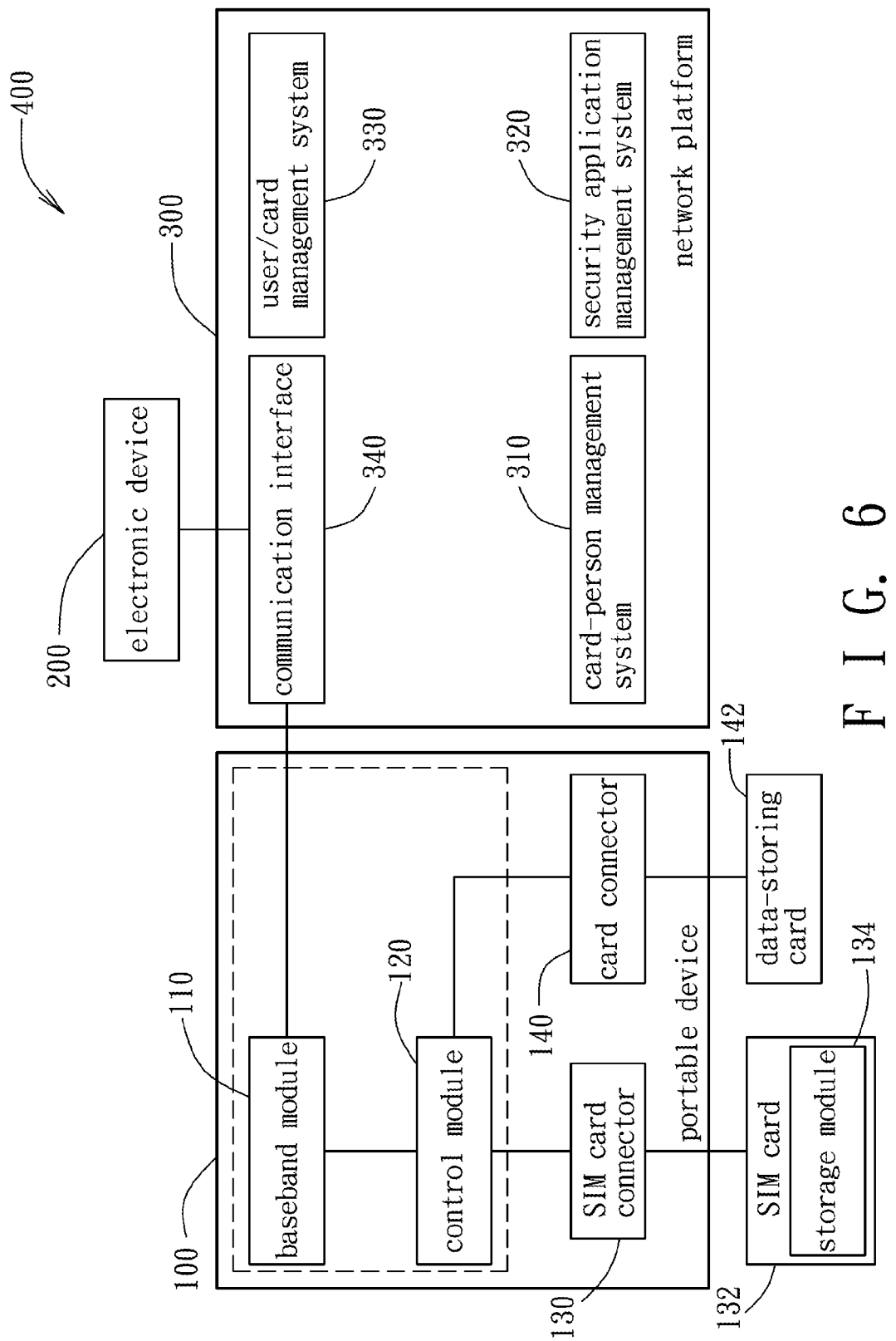
FIG. 6 is a schematic block diagram showing a mobile device according to a second preferred embodiment of the present invention.

As shown in FIG. 6, the second preferred embodiment of the data transferring system 400 according to the present invention has a structure similar to that of the first preferred embodiment. The main difference between this embodiment and the first preferred embodiment resides in the following.

The portable device 100 in this embodiment includes the SIM card connector 130, and the SIM card 132 may include a storage module 134, in which the to-be-transferred data may be stored. As a result, the storage module 150 of the portable device 100 of the first preferred embodiment may be omitted. The control module 120 in this embodiment is coupled to the baseband module 110 and the SIM card connector 140, and is configured to control transmission of the to-be-transferred data received by the baseband module 110 to the SIM card 132 that is coupled to the SIM card connector 140, for storage in the storage module 134 of the SIM card 132.

The second preferred embodiment has the same advantages as those of the first preferred embodiment.

Figure 7:
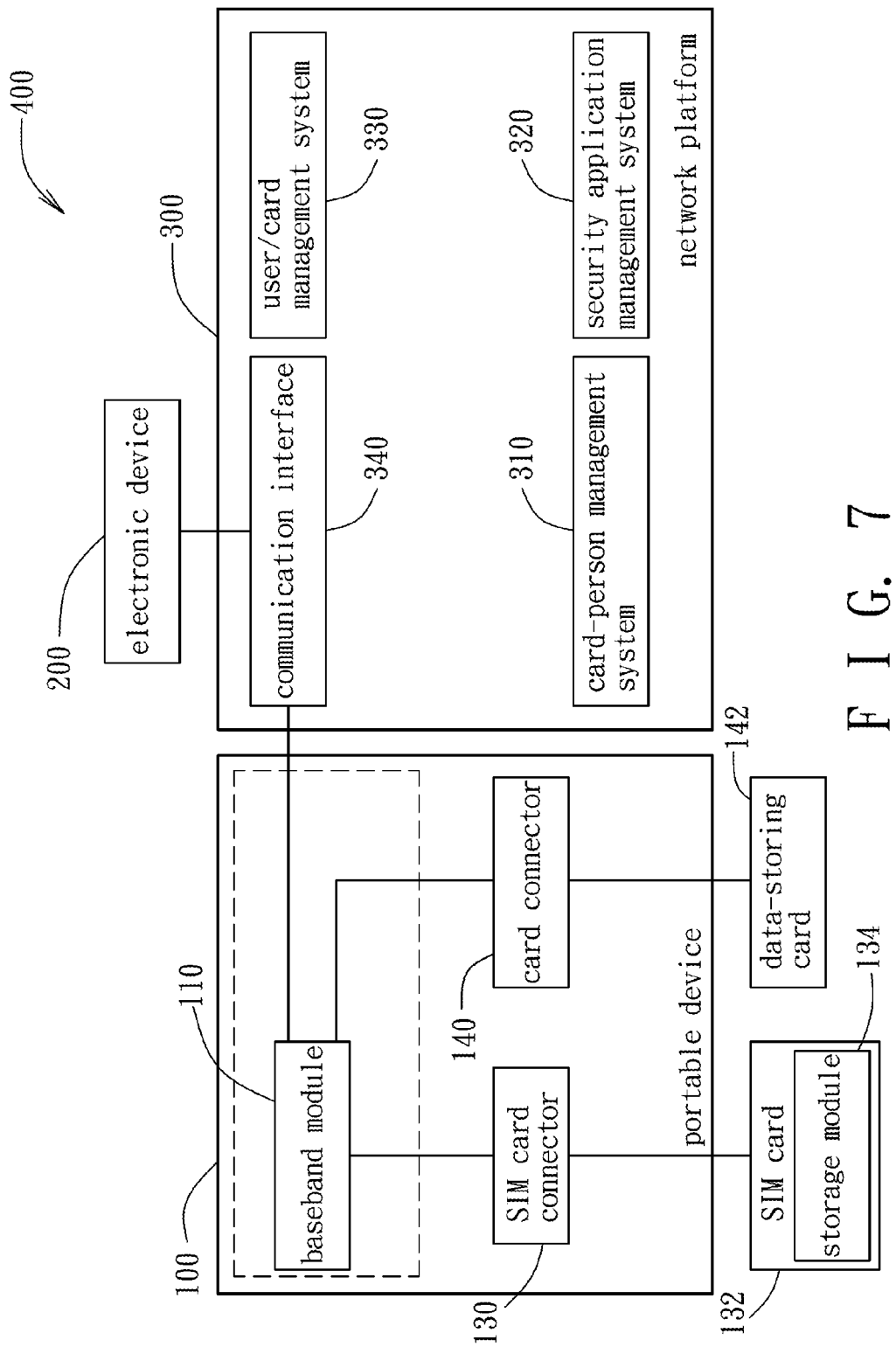
FIG. 7 is a schematic block diagram showing a mobile device according to a third preferred embodiment of the present invention.

As shown in FIG. 7, the third preferred embodiment of the data transferring system 400 according to the present invention has a structure similar to that of the second preferred embodiment. The main difference between this embodiment and the second preferred embodiment resides in that the control module 120 of the portable device 100 may be further omitted. As a result, the baseband module 110 is configured to transmit the to-be-transferred data received thereby to the SIM card 132 that is coupled to the SIM card connector 130, for storage in the storage module 134 of the SIM card 132.

The third preferred embodiment has the same advantages as those of the previous preferred embodiments.

Figure 5:
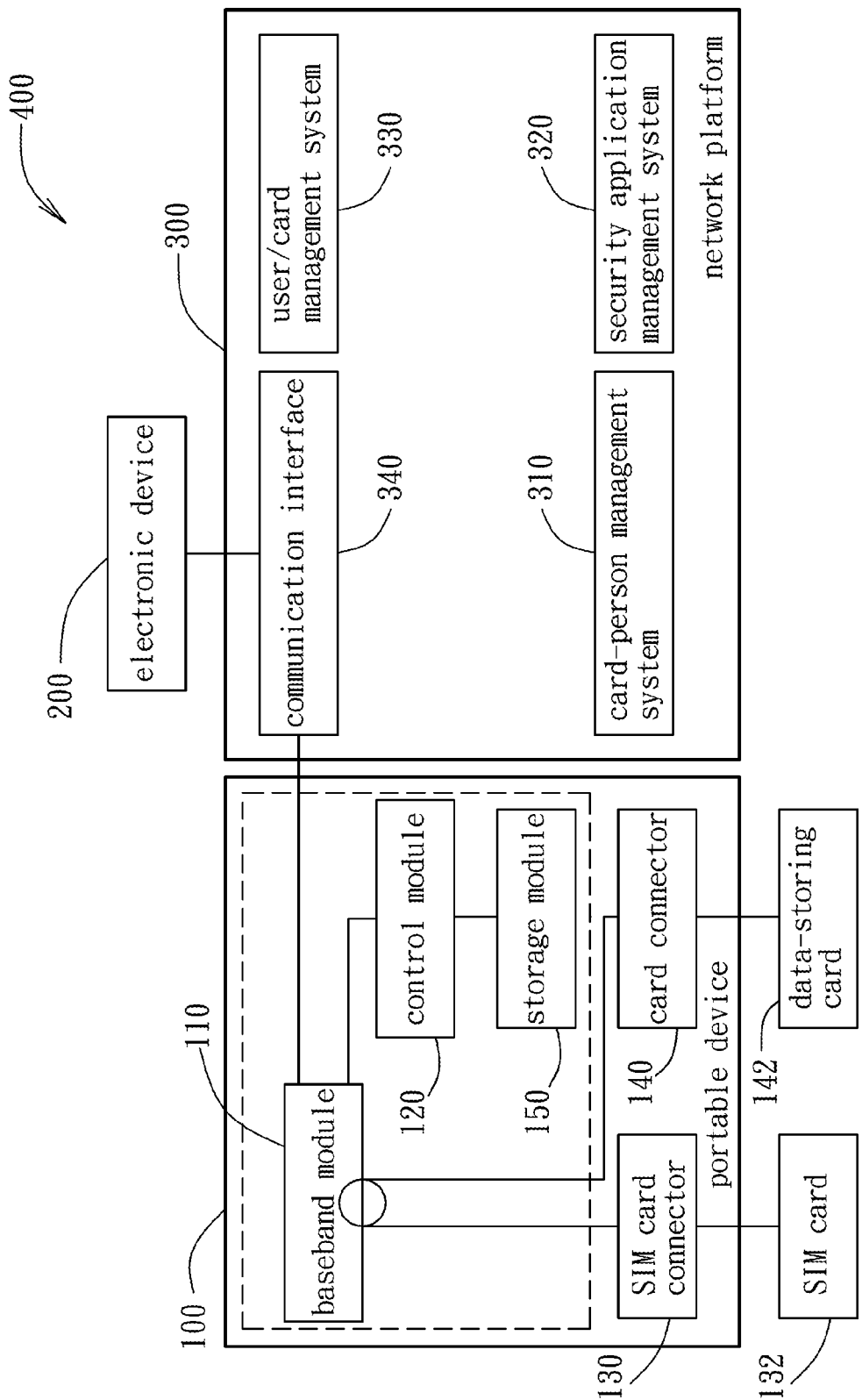
FIG. 5 is a schematic block diagram showing a mobile device according to a modification of the first preferred embodiment.
Figure 8:
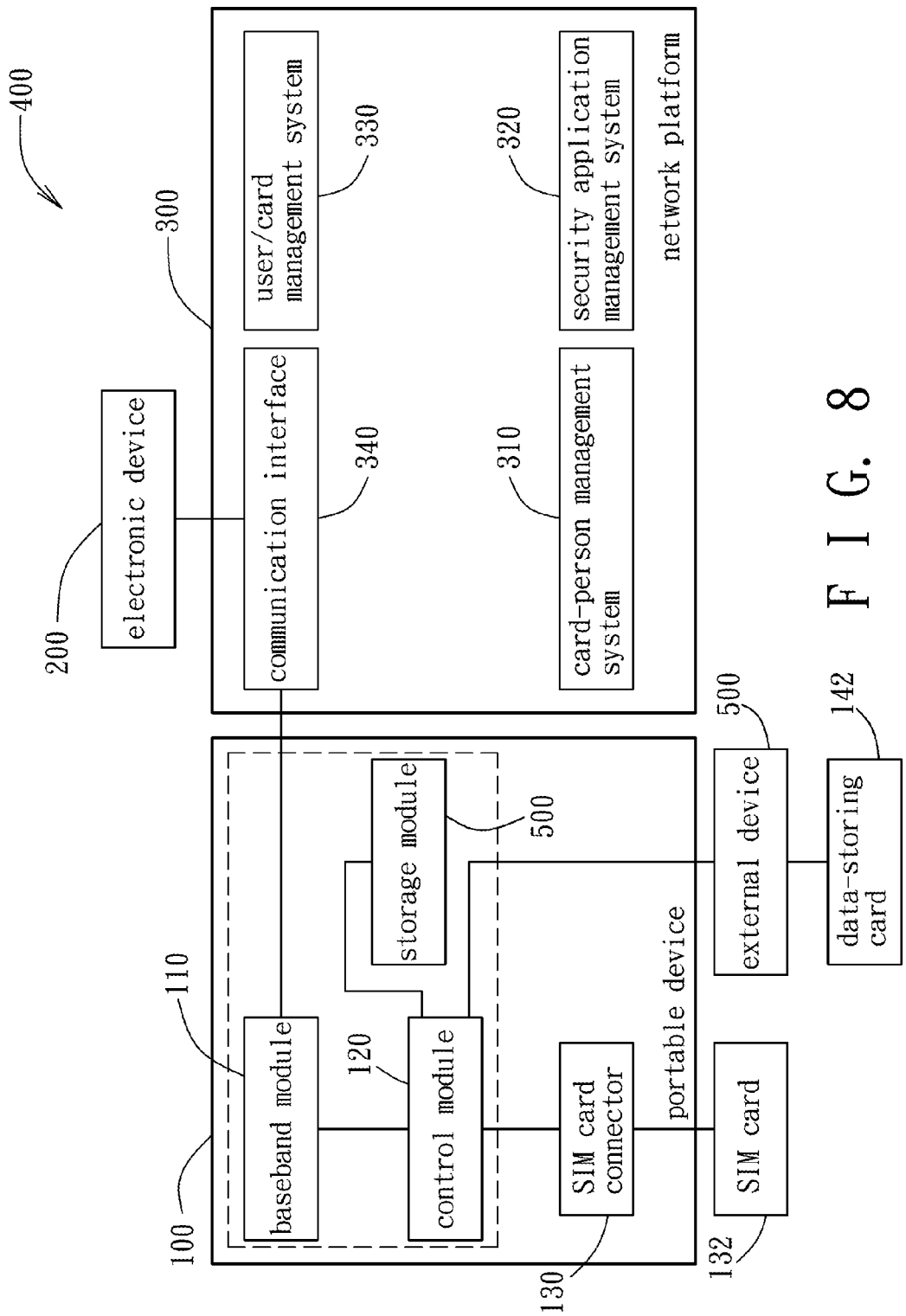
FIG. 8 is a schematic block diagram showing a mobile device according to a fourth preferred embodiment of the present invention.

As shown in FIG. 8, the fourth preferred embodiment of the data transferring system 400 according to the present invention has a structure similar to that of the embodiment of FIG. 5. The main difference between this embodiment and the embodiment of FIG. 5 resides in that, the data transferring system 400 further comprises an external device 500 detachably coupled to the control module 120 of the portable device 100, and configured to be coupled to the data-storing card 142. The card connector 140 of the portable device 100 of FIG. 5, in this regard, may be omitted. The external device 500 may be embodied as a smart card reader that provides an interface to the data-storing card 142 using micro universal serial bus (USB) or its variations (miniUSB, microUSB, etc.). In some embodiments, the external device 500 may be configured to communicate with the portable device 100 wirelessly via, for example, wireless fidelity (wi-fi), Bluetooth, near field communication (NFC)/Radio-frequency identification (RFID), infrared radiation, or the like.

The fourth preferred embodiment has the same advantages as those of the previous preferred embodiments.

Figure 9:
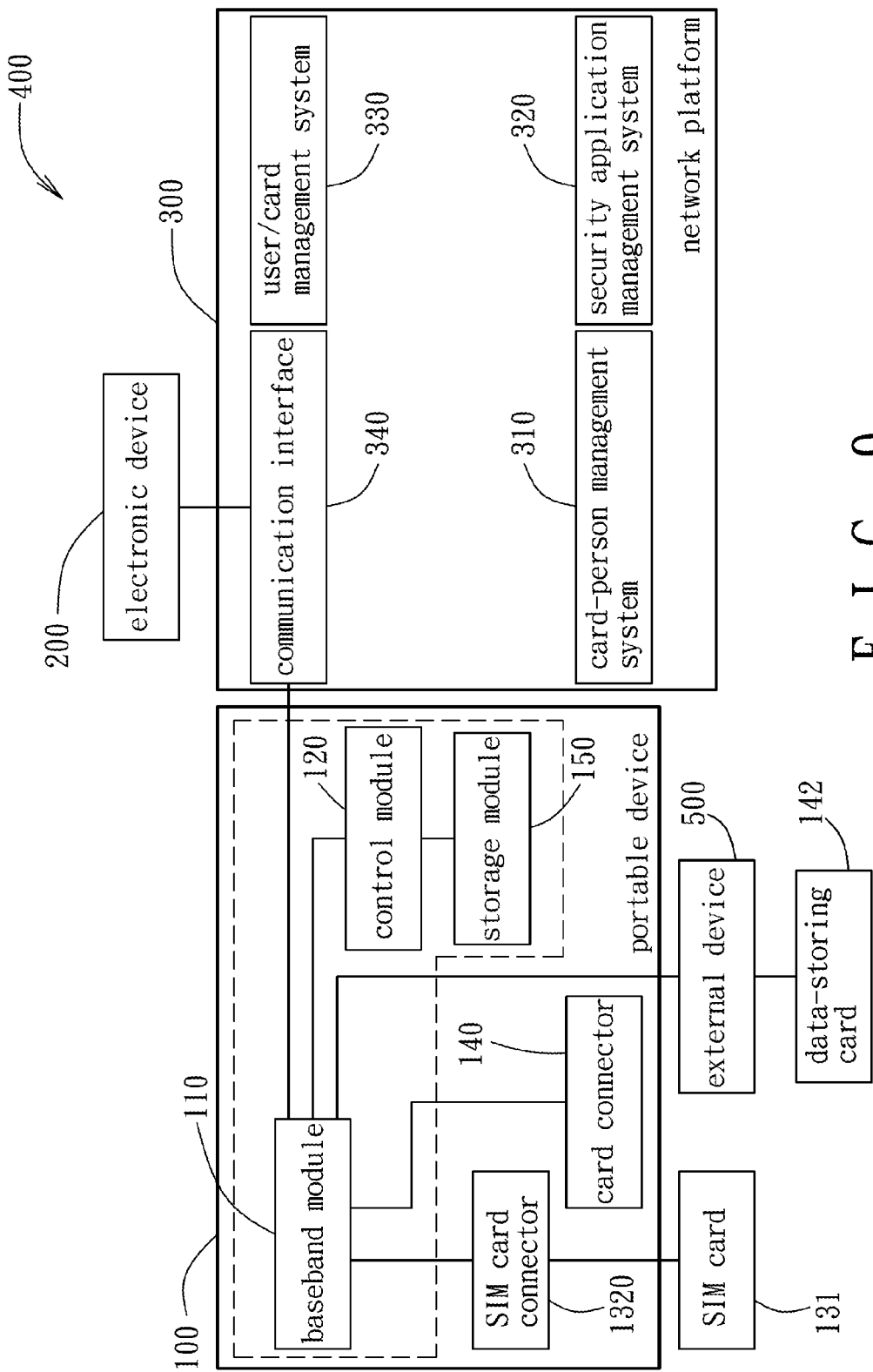
FIG. 9 is a schematic block diagram showing a mobile device according to a modification of the fourth preferred embodiment.

In a modification of this embodiment (see FIG. 9), the external device 500 is detachably coupled to the baseband module 110 of the portable device 100, and that the portable device 100 includes the card connector 140. In the presence of the external device 500, the card connector 140 is available to be coupled to various other cards.

In cases where the user of the portable device 100 is not interested in storing the to-be-transferred data in his/her device (e.g., due to storage space limitations), the to-be-transferred data may be transmitted to other peripheral components that are able to communicate with the portable device 100.

For example, a storage module of the external device 500 may be utilized for storing the to-be-transferred data. As shown in FIG. 10, in the fifth preferred embodiment of the data transferring system 400, the external device 500 is coupled to the control module 120 of the portable device 100, and includes a storage module 510 for storing the to-be-transferred data therein. The control module 120 is configured to control transmission of the to-be-transferred data received by the baseband module 112 to the external device 500 for storage in the storage module 510 of the external device 500.

Figure 11:
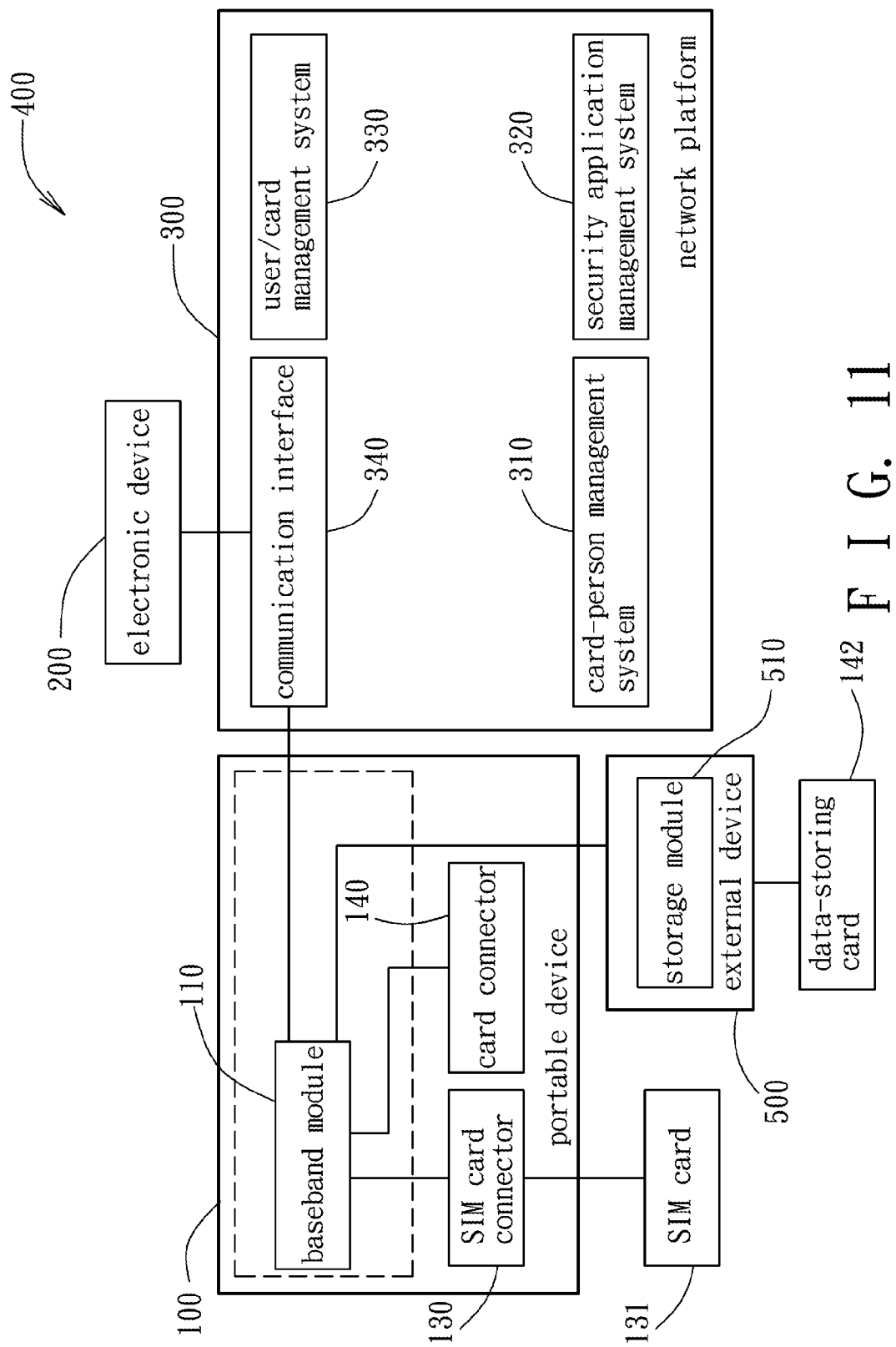
FIG. 11 is a schematic block diagram showing a mobile device according to a sixth preferred embodiment of the present invention.

As shown in FIG. 11, the sixth preferred embodiment of the data transferring system 400 according to the present invention has a structure similar to that of the fifth preferred embodiment. The main difference between this embodiment and the fifth preferred embodiment resides in that the portable device 100 includes the SIM card connector 130 and the card connector 140 that are coupled to the baseband module 110. Furthermore, the control module 120 is omitted in this embodiment, such that the baseband module 110 is configured to transmit the to-be-transferred data to the external device 500 for storage in the storage module 510.

The fifth and sixth preferred embodiments have the same advantages as those of the previous preferred embodiments.

In some embodiments, the to-be-transferred data may be transmitted to the data-storing card 142 or another data-storing card for storage in a storage module thereof.

In the seventh preferred embodiment of the data transferring system 400 (see FIG. 12), the control module 120 of the portable device 100 is coupled to the baseband module 110 and the external device 500, and is configured to control transmission of the to-be-transferred data received by the baseband module 110 to the external device 500 for storage in the storage module 144' of the data-storing card 142' that is coupled to the external device 500.

Figure 13:
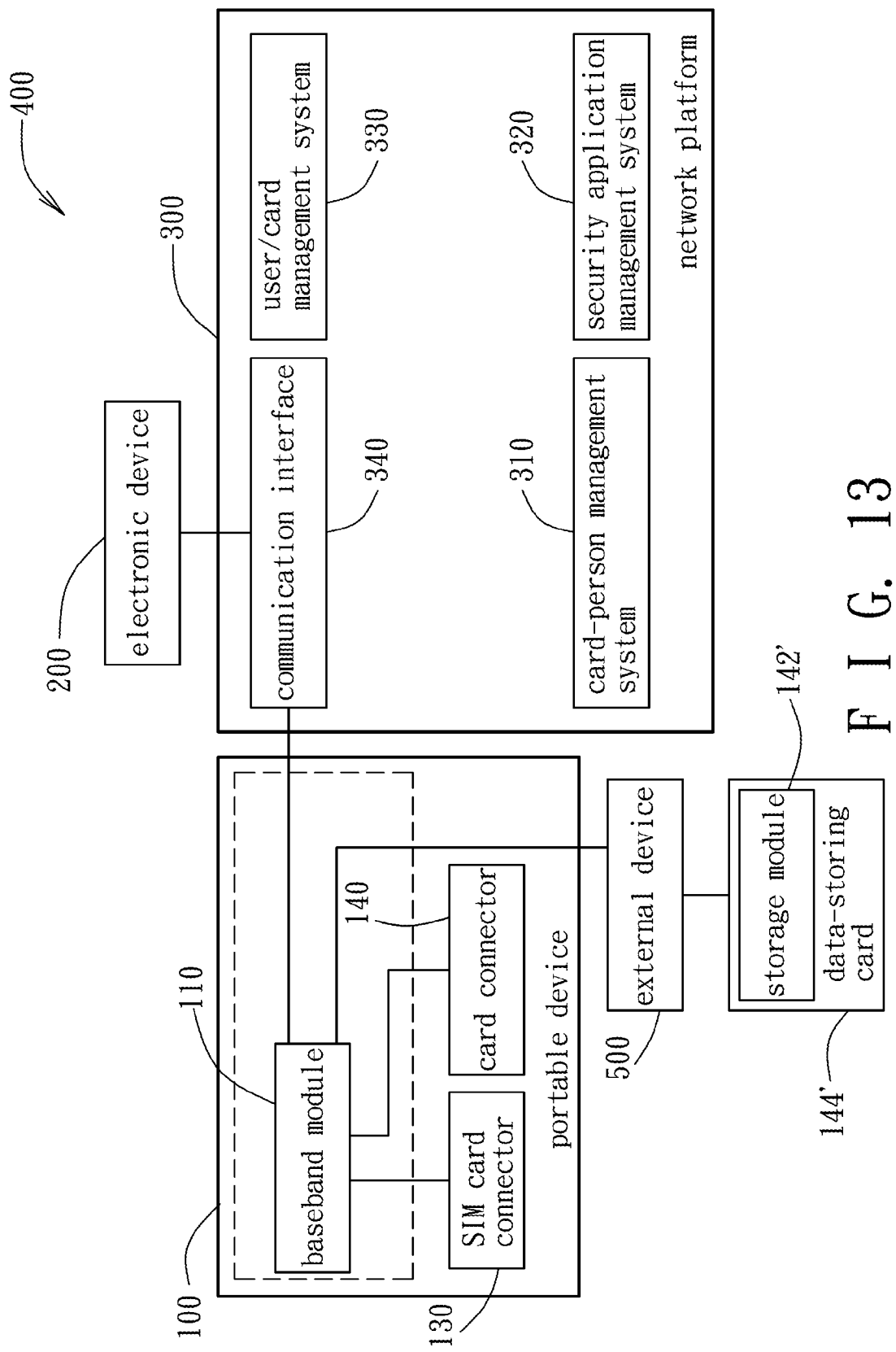
FIG. 13 is a schematic block diagram showing a mobile device according to a modification of the seventh preferred embodiment.

In a modification of this embodiment (see FIG. 13), the baseband module 110 is coupled to the external device 500, and is configured to transmit the to-be-transferred data to the external device 500 for storage in the storage module 144' of the data-storing card 142' that is coupled to the external device 500.

The seventh preferred embodiment has the same advantages as those of the previous preferred embodiments.

To sum up, embodiments of this invention enable the portable device 100, having other peripheral components (i.e., the SIM card 132, the data-storing card 142', or the external device 500) attached thereto, to serve as a virtual JAVA card that is capable of performing the functions that originally require various physical cards, since the card-specific data and the corresponding APPs are both retrieved by and made accessible to the portable device 100. When a number of products and/or services are integrated into the portable device 100 in such manner, the corresponding physical cards not in need may be then returned to the vendors or discarded. The card connector 140 may also be left available for other uses.

This invention may be particularly useful when the user of the portable device 100 is interested in utilizing a large number of sticky products and/or services.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for processing a data transfer related to a data-storing card that stores card-specific data and a card account number, said method to be implemented using a data transferring system and comprising:
    (A) when the data-storing card is coupled to an electronic device of the data transferring system, accessing, by the electronic device, the card-specific data and the card account number from the data-storing card;
    (B) generating, by the electronic device, a device-generated authentication number associated with the data transfer;
    (C) transmitting, by the electronic device, the card account number, the card-specific data and the device-generated authentication number to a network platform of the data transferring system;
    (D) receiving, by a portable device of the data transferring system, an inputted authentication number;
    (E) transmitting, by the portable device, the inputted authentication number to the network platform;
    (F) comparing, by the network platform, the inputted authentication number and the device-generated authentication number; and
    (G) when the inputted authentication number is deemed to correspond with the device-generated authentication number, transmitting, by the network platform, to-be-transferred data which is derived from the card-specific data, to the portable device.

2. The method of claim 1, wherein the electronic device is associated with a vendor, and in step (D), a user of the portable device is informed by the vendor of the device-generated authentication number, and the user subsequently inputs the device-generated authentication number into the portable device to serve as the inputted authentication number;
    wherein the to-be-transferred data includes an executable application associated with the vendor and to be executed by the portable device, and the executable application is a JAVA security applet.

3. The method of claim 1, wherein the data-storing card conforms with one of the International Organization for Standardization (ISO) 7816 standard and the ISO 14443 standard.

4. The method of claim 1, wherein:
    the card account number includes at least one of a phone number associated with the portable device, an identification number of a user of the portable device, a birth date of the user of the portable device, and a card number of the data-storing card;
    in step (F), the network platform deems the inputted authentication number to correspond with the device-generated authentication number when the inputted authentication number is found to be identical to the device-generated authentication number; and
    in step (G), the network platform transmits the to-be-transferred data when the inputted authentication number is deemed to logically correspond with the device-generated authentication number.

5. A data transferring system for processing a data transfer related to a data-storing card that stores card-specific data and a card account number, said data transferring system comprising:
    an electronic device configured to be coupled to the data-storing card for accessing the card-specific data and the card account number stored therein;
    a portable device; and
    a network platform that is operable to communicate with said portable device and said electronic device;
    wherein said electronic device is configured to generate a device-generated authentication number associated with the data transfer, and to transmit the card account number, the card-specific data and the device-generated authentication number to said network platform;
    wherein said portable device is configured to receive an inputted authentication number and to transmit the inputted authentication number to said network platform; and
    wherein said network platform is configured to compare the inputted authentication number with the device-generated authentication number, and to transmit to-be-transferred data, which is derived from the card-specific data, to said portable device when the inputted authentication number is deemed to correspond with the device-generated authentication number.

6. The data transferring system of claim 5, wherein said portable device includes:
    a baseband module configured to communicate with said network platform so as to receive the to-be-transferred data therefrom, said baseband module including one of a baseband processor and an application processor;
    a storage module; and
    a control module coupled to said baseband module and said storage module and configured to control transmission of the to-be-transferred data received by said baseband module to said storage module for storage in said storage module;
    wherein said storage module and said control module are integrated using an integrated circuit (IC) application chip having a JAVA card-based design that implements a JAVA virtual machine.

7. The data transferring system of claim 5, wherein said portable device includes:
    a baseband module configured to communicate with said network platform so as to receive the to-be-transferred data therefrom;
    a subscriber identity module (SIM) card connector configured to be coupled to a SIM card; and
    a control module coupled to said baseband module and said SIM card connector and configured to control transmission of the to-be-transferred data received by said baseband module to the SIM card that is coupled to said SIM card connector for storage in the SIM card.

8. The data transferring system of claim 5, wherein said portable device includes:
    a baseband module configured to communicate with said network platform so as to receive the to-be-transferred data therefrom; and
    a subscriber identity module (SIM) card connector coupled to said baseband module, and configured to be coupled to a SIM card;

wherein said baseband module is configured to transmit the to-be-transferred data received thereby to the SIM card that is coupled to said SIM card connector for storage in the SIM card.

9. The data transferring system of claim 5, wherein:
said network platform deems the inputted authentication number to correspond with the device-generated authentication number when the inputted authentication number is identical to the device-generated authentication number, or is deemed to logically correspond with the device-generated authentication number.

10. The data transferring system of claim 5, wherein said electronic device is associated with a vendor, and the to-be-transferred data includes an executable application associated with the vendor and to be executed by said portable device;
wherein the executable application is a JAVA security applet.

11. The data transferring system of claim 5, wherein the card account number includes at least one of a phone number associated with said portable device, an identification number of a user of said portable device, a birth date of the user of said portable device, and a card number of the data-storing card.

12. The data transferring system of claim 5, wherein:
the data-storing card conforms with one of the International Organization for Standardization (ISO) 7816 standard and the ISO 14443 standard; and
said portable device includes a card connector configured to be coupled to the data-storing card.

13. The data transferring system of claim 5, further comprising an external device detachably coupled to said portable device and configured to be coupled to the data-storing card.

14. The data transferring system of claim 13, wherein:
said external device includes a storage module for storing the to-be-transferred data therein; and
said portable device includes a baseband module configured to communicate with said network platform so as to receive the to-be-transferred data therefrom, and a control module coupled to said baseband module and said external device and configured to control transmission of the to-be-transferred data received by said baseband module to said external device for storage in said storage module.

15. The data transferring system of claim 13, wherein:
said external device includes a storage module for storing the to-be-transferred data therein; and
said portable device includes a baseband module configured to communicate with said network platform so as to receive the to-be-transferred data therefrom, and coupled to said baseband module and said external device;
wherein said baseband module is configured to transmit the to-be-transferred data to said external device for storage in said storage module.

16. The data transferring system of claim 13, wherein said portable device includes a baseband module configured to communicate with said network platform so as to receive the to-be-transferred data therefrom, and a control module coupled to said baseband module and said external device and configured to control transmission of the to-be-transferred data received by said baseband module to said external device for storage in the data-storing card that is coupled to said external device.

17. The data transferring system of claim 13, wherein said portable device includes a baseband module configured to communicate with said network platform so as to receive the to-be-transferred data therefrom, said baseband module being coupled to said external device and being configured to transmit the to-be-transferred data to said external device for storage in the data-storing card that is coupled to said external device.

* * * * *

UNITED STATES PATENT AND TRADEMARK OFFICE
CERTIFICATE OF CORRECTION

| | | |
|---|---|---|
| PATENT NO. | : 9,021,571 B2 | Page 1 of 1 |
| APPLICATION NO. | : 14/143272 | |
| DATED | : April 28, 2015 | |
| INVENTOR(S) | : Tsai et al. | |

It is certified that error appears in the above-identified patent and that said Letters Patent is hereby corrected as shown below:

On the title page item (72) should read

(72)     Inventors:     Irene Tsai, New Taipei (TW);
                                     Yi-Fen Chou, Keelung (TW);
                                     <u>Kung-Wei Chang, New Taipei (TW)</u>

Signed and Sealed this
Fifteenth Day of December, 2015

Michelle K. Lee
*Director of the United States Patent and Trademark Office*